United States Patent [19]

Wartenberg

[11] 4,133,710
[45] Jan. 9, 1979

[54] METHOD FOR FORMING A POLYETHYLENE LAYER ON A SUBSTRATE

[75] Inventor: Erwin W. Wartenberg, Stuttgart, Fed. Rep. of Germany

[73] Assignee: Cordotex SA, Lausanne, Switzerland

[21] Appl. No.: 778,192

[22] Filed: Mar. 16, 1977

Related U.S. Application Data

[63] Continuation-in-part of Ser. No. 542,877, Jan. 21, 1975, abandoned.

[51] Int. Cl.² .............................................. B29F 3/08
[52] U.S. Cl. ............................. 156/244.27; 427/361; 427/362; 427/365; 427/369; 427/398 A
[58] Field of Search ............... 427/361, 365, 369, 362, 427/398, 398 A; 156/244; 428/462, 572, 573

[56] References Cited

U.S. PATENT DOCUMENTS

| | | | |
|---|---|---|---|
| 2,877,140 | 3/1959 | Olstad | 427/398 A |
| 3,013,900 | 12/1961 | Yezck et al. | 427/362 |
| 3,075,868 | 1/1963 | Long | 156/244 |
| 3,215,578 | 11/1965 | Craver | 156/244 |
| 3,392,076 | 7/1968 | Van Gilse et al. | 156/244 |
| 3,448,000 | 6/1969 | Pacquin et al. | 156/244 |
| 3,498,865 | 3/1970 | Pacquin et al. | 156/244 |
| 3,589,975 | 6/1971 | Andrews et al. | 156/244 |
| 3,640,788 | 2/1972 | Flynn | 156/244 |
| 3,700,525 | 10/1972 | Violfette et al. | 156/244 |

Primary Examiner—Ronald H. Smith
Assistant Examiner—Janyce A. Bell
Attorney, Agent, or Firm—Ladas, Parry, Von Gehr, Goldsmith & Deschamps

[57] ABSTRACT

Adhesion between extruded polyethylene film and a substrate consisting of paper or paper lined metal foil is improved when the substrate and film are pressed together by passing through rollers which also cool the film to below its softening temperature, wherein at least one of said rolls which is brought into contact with the polyethylene coating is moistened on its rolling surface with a liquid having a critical surface tension below 73 dyne/cm, a boiling point below 100° C and consisting of a mixture of water and between 10% and 50% ethyl alcohol.

7 Claims, 6 Drawing Figures

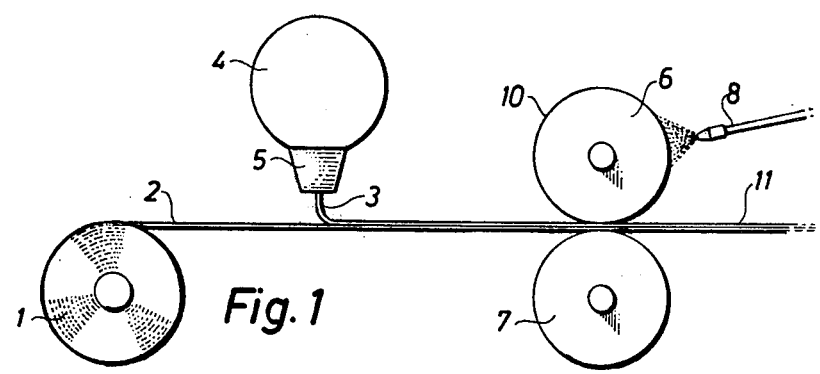
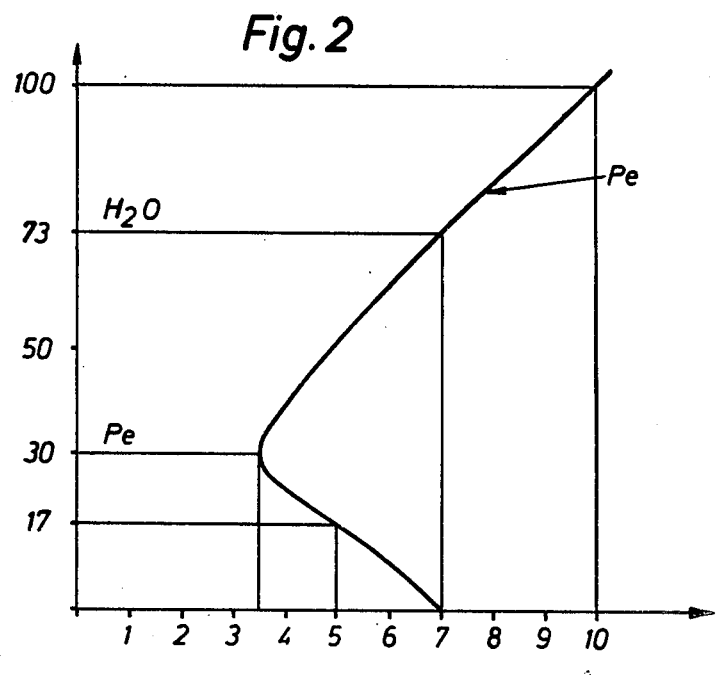

METHOD FOR FORMING A POLYETHYLENE LAYER ON A SUBSTRATE

CROSS REFERENCE TO RELATED APPLICATIONS

This application is a continuation-in-part of my earlier application Ser. No. 542,877, filed Jan. 21, 1975, abandoned.

BACKGROUND OF THE INVENTION

1. Field of the Invention

The present invention is concerned with a process and an apparatus for coating a substrate, consisting of a strip of paper or paper lined with metal foil, with a polyethylene thermoplastic, in which the thermoplastic material is extruded to a thin film which, while it is still warm, is brought into contact with the substrate and, with simultaneous cooling to a temperature below the softening temperature of the plastic material, is pressed together with the substrate.

In the production of, for example, coated material for packing purposes, there is often used a layer of thermoplastic material, for example polyethylene, applied to a substrate where the thermoplastic material is extruded to a thin film which, while it is still in the molten or semi-molten state, is united with the substrate which may, for example, consist of a strip of cardboard or a metal foil.

In order to achieve good adhesion between the extruded thermoplastic coating and the substrate, they are pressed together between cooled pressure rollers, whereby the thermoplastic layer is brought into good contact with the substrate and at the same time is stabilized by cooling. When carrying out this coating process it often happens that the plastic material adheres to the cooling roll and that the coating material is in this case subjected to a force that is mainly at right angles to the coating surface. This force can easily cause a delamination of the material that is not necessarily confined to the boundary zone of the applied plastic layer. The delamination can be localized in the substrate, for example if this consists of paper or other cellular material.

2. Description of the Prior Art

Attempts have been made to avoid the above mentioned difficulty by wetting the cooling roll with water as well as by applying a coating of polytetrafluoroethylene, sold under the trade mark "Teflon", to the outer surface of the roll. The best result is achieved with the "Teflon" coated roll but delamination can occur even with such a cooling roll; moreover it has been found that the "Teflon" material cannot withstand for sufficiently long the mechanical and thermal stresses which arise at the outer surface of the cooling roller.

U.S. Pat. No. 3,215,578 granted Nov. 2, 1965 to J. N. Craver, Jr. describes and claims an apparatus and method for forming optically clear thermoplastic coated regenerated cellulose film. In this patent a cellulose film is prefabricated to have a moisture-proof wax coating on one surface, while the thermoplastic layer is extruded and in hot condition is brought together with the other surface of the cellulose film by means of pressure rolls. The pressure roll which contacts the moisture-proof surface of the cellulose film is rubber coated while the roll which contacts the thermoplastic layer is a metal chill roll. A liquid is applied to the rubber roll which contacts the cellulose layer, not the plastic film. In the claimed method of this patent, water is used as the liquid.

The invention of U.S. Pat. No. 3,215,578 is concerned with avoiding damage affecting optical clarity of the film and resulting from impressions in the cellulose layer, caused by irregularities in the rubber roll. The present invention is concerned with a different problem, preventing adhesion of a polyethylene film to the roll which contacts said film. To solve the present problem, a specific water-alcohol mixture is applied to a roll which contacts the polyethylene film, in contrast to the use of any kind of liquid, particularly water, in U.S. Pat. No. 3,215,578, which applies the liquid so as to contact the cellulose layer, not the polyethylene layer.

In accordance with U.S. Pat. No. 3,498,865 granted on Mar. 3, 1970 to Leon J. Paquin et al., paper is coated with polyethylene with use of a cooled roll in contact with the hot plastic. The cooled roll is coated with polytetrafluoroethylene to prevent the plastic from sticking to the roll. As described above, there have been found to be problems of durability of the "Teflon" coating.

U.S. Pat. No. 3,589,975 granted on June 29, 1971 to W. P. Andrews et al. is concerned with laminating plastic and metallic sheets, and does not disclose a means of avoiding adhesion of the plastic to a roll during cooling of the plastic.

SUMMARY OF THE INVENTION

The invention provides a process for the coating of a substrate, consisting of paper or paper lined with a metal foil, with polyethylene, in which the polyethylene is extruded to a thin film which, while it is still warm, is brought into contact with the substrate and, with simultaneous cooling to a temperature below the softening temperature of the polyethylene, is pressed together with the substrate by passing the substrate and the extruded polyethylene film through cooperating rolls wherein at least one roll which is brought into contact with the polyethylene coating is moistened on its rolling surface with a liquid that has a critical surface tension below 73 dyne/cm and a boiling point below 100° C., and consists of a mixture of water and between 10% and 50% ethyl alcohol, whereby an uninterrupted liquid layer is applied to the whole contact surface of the roll or rolls with the polyethylene coating.

Preferably the liquid is a mixture of water and from about 25% to about 35% ethyl alcohol. The optimum liquid mixture is about 35% ethyl alcohol and about 65% water, which will give the liquid a surface tension of about 30 dyne/cm, which is the critical surface tension for polyethylene. However, substantial improvements are achieved with a liquid mixture having 10% ethyl alcohol, giving a surface tension of about 46 dyne/cm. Moreover, a liquid mixture having about 25% ethyl alcohol provides a surface tension close to the optimum for polyethylene, and thus is also preferred. A range of 10–35% ethyl alcohol is suitable.

The percentages described herein are on the basis of volume.

BRIEF DESCRIPTION OF THE DRAWINGS

In the accompanying drawings:

FIG. 1 is a schematic sketch of a coating apparatus.

FIG. 2 is a diagram showing how the adhesion between cooling roller and thermoplastic coating varies according to the critical surface tension of the cooling roller.

DESCRIPTION OF THE PREFERRED EMBODIMENT

Figure 3:
FIG. 3 is a representation of a photographic enlargement of a cross-section through a coating material which has delaminated.

In order to clarify the reason for the selection of the liquid to be used in the invention, the concept of critical surface tension will be discussed in more detail.

It can be said that the critical surface tension of a material is a measure of the tendency to wetting, where the wetting tendency is greater at a lower critical surface tension than at a higher. The physical measure of critical surface tension is expressed in dyne/cm and the value of the critical surface tension can be determined experimentally in several ways well known to those skilled in the art.

It has been found that the critical surface tension for pure metals (measured in a vacuum) is very high, about 1,000–4,000 dyne/cm. Under the conditions prevailing in the coating of a substrate, e.g. — paper, with an extruded plastic film it has however been found that the critical surface tension is considerably lower in the case of a polished metal roller, namely about 100 dyne/cm. By wetting a brightly polished cooling roller with water the critical surface tension of the roller can be reduced to the critical surface tension of water which is about 73 dyne/cm, because the extruded plastic coating does not come into contact with the metal roller but only with the water film covering the roller.

If a polytetrafluoroethylene coating, i.e. the material sold under the trade name "Teflon", is applied to the pressing roller, then the critical surface tension of the roller is reduced to about 17 dyne/cm, i.e. the critical surface tension of the "Teflon" material.

The plastic material used as a coating usually has a critical surface tension of about 30 dyne/cm (polyethylene has a critical tension between 29 and 32 dyne/cm depending on moisture, temperature and other conditions prevailing during the extrusion).

By adding a surface-tension reducing agent, for example ethyl alcohol, acetic acid or acetone, to water, the surface tension can be reduced as shown by the table below, which means that the critical surface tension can be adjusted as desired by adding the substances mentioned, a fact which — as shown by the description below — is very important.

The arrangement shown schematically in FIG. 1 has a supply roll 1 with a strip 2 of paper or paper coated with aluminum foil, to which a plastic coating is to be applied. The plastic coating 3, which for example may consist of polyethylene, is — while still in the molten state — applied to the strip 2 by means of an extrusion press 4 in which the plastic material is heated to melting and extruded through an elongated, cleft-like valve 5 to form a thin film 3. The strip 2 coated with the plastic film 3 is fed in between two cooperating pressing rolls 6 and 7, of which roll 6 is cooled by a cooling agent, preferably water, which is caused to circulate within the roll. By means of a spraying arrangement 8, a liquid in finely divided form is sprayed on to the surface of the roll 6 care being taken that the whole surface of the roll is covered by a liquid layer preferably of uniform thickness. The composition of the said liquid is discussed in detail below and the liquid need not necessarily be applied by spraying but good results can also be obtained by introducing the liquid in other ways, for example by dipping the roller or by applying with a moistened guiding roller. The finished coating material is indicated in FIG. 1 by 11.

When the plastic coating 3, stabilized by cooling, has passed the cooling roll 6, the contact between the surface of the cooling roll and the plastic coating 3 must be interrupted and, because a certain amount of sticking of the plastic coating to the cooling roll always occurs, a tension arises at right angles to the surface of the coating material 11. Since the coating material if it consists, for example, of fibrous material or of fibrous material covered with aluminum foil, has its lower tensile strength at right angles to the surface of the material (the so-called Z-direction), tears in the material, i.e. so-called cleavage phenomena (delamination), are liable to occur when the coating material has to be pulled off from the cooling roll. In general, cleavage does not occur in the boundary layer between plastic coating and paper, but this cleavage occurs most frequently in the paper layer close to the plastic coating as shown by FIG. 3 which is a 200-fold enlargement of a cross-section of a delaminated coating material. In FIG. 3 the plastic coating is shown by 12, the fibrous material by 14 and the delaminated zone by 13. In order to avoid delamination, it is necessary either to use paper material with such a high Z-strength (tensile strength in the Z-direction) that, in spite of the stresses that arise in the separation of the coating 11 from the cooling roll 6, no delamination occurs, or to ensure that the adhesion between the cooling roll 6 and the coating material 11 is as small as possible. As it is usually difficult to determine the quality and the Z-strength of the paper, the adhesion between the plastic material and the cooling roll 6 must be reduced, while can be done in the way shown by the invention.

In FIG. 2 a diagram is reproduced in which the horizontal axis shows on a linear scale the adhesion between cooling roll and plastic coat and the vertical axis, expressed in dyne/cm, the critical surface tension. In addition, the diagram shows a curve indicated by "Pe" which illustrates the adhesion between a polyethylene coating and a cooling roll with cooling roll coatings having various critical surface tensions.

The horizontal axis has no subdivisions in absolute numbers because the adhesion depends on several factors, for example the diameter of the roll and the width of the strip, but the subdivision is indicated by means of relative numbers 0–10.

As can be seen from FIG. 2, the adhesion is greatest (10) when the cooling roll consists of a dry, polished steel roll with a critical surface tension that should here be 100 dyne/cm. If the roll is wetted with water, then the critical surface tension becomes about 73 dyne/cm and the adhesion is reduced to 7. By the use of a "Teflon" coated cooling roll the critical surface tension can be still further reduced even to about 17 dyne/cm and, as shown by the diagram, the adhesion becomes about 5, which must mean that only a small reduction of the adhesion has occurred although the critical surface tension has been reduced from 73 to 17. By looking at the experimentally produced diagram it is seen that the smallest possible adhesion, about 3.5, is obtained if the surface of the cooling roll has a critical surface tension of about 30 dyne/cm, i.e. the same critical surface tension as the polyethylene material.

The present invention is particularly surprising in view of the fact that it leads to lower adhesion than when "Teflon" is used, even though the liquid presently used has a higher surface tension than "Teflon".

As already mentioned, the cooling roll can be wetted with a liquid, the critical surface tension of which is regulated by, for example, mixing ethyl alcohol, acetic acid or acetone (other agents may also be used) in suitable proportions with water. Since the coating material is to be used for the packing of foodstuffs, ethyl alcohol is the most suitable additive, and from the table below it can be seen that an admixture of about 35% ethyl alcohol with water gives a surface tension of about 30 dyne/cm.

TABLE

| Water | Ethyl alcohol (b.p. 78.5°) | Critical surface tension |
|---|---|---|
| 100% | 0% | 72 dyne/cm |
| 90% | 10% | 46 " |
| 75% | 25% | 34 " |
| 50% | 50% | 27 " |
| 0% | 100% | 21 " |
| Water | Acetic acid (b.p. 118.1° C) | Critical surface tension |
| 90% | 10% | 55 dyne/cm |
| 70% | 30% | 44 " |
| 50% | 50% | 38 " |
| 0% | 100% | 26 " |
| Water | Acetone (b.p. 56.5° C) | Critical surface tension |
| 90% | 10% | 49 dyne/cm |
| 75% | 25% | 38 " |
| 50% | 59% | 27 " |

Figure 4:
FIG. 4 is a representation of a photographic enlargement of a cross-section through a coating produced in accordance with the invention.

If a mixture is fed to the cooling roll 6 in a uniform and uninterrupted layer consisting of 65% water and 35% ethyl alcohol, the adhesion between the cooling roll 6 and the plastic coating of the coating material 11 becomes as small as possible (3.5 according to diagram in FIG. 2), and a delamination can be prevented. A greatly enlarged (100-fold) cross-section of a coating material that had been treated in accordance with the above instructions, is shown in FIG. 4 where the plastic coating is indicated by 12 and the fibrous layer by 13 and it can be seen from the figure that no delamination has occurred.

A further advantage of the method of the invention is that the plastic coating of the invention has a very uniform surface structure compared with the corresponding surface structure of a plastic coating material produced in the traditional way.

Figure 5:
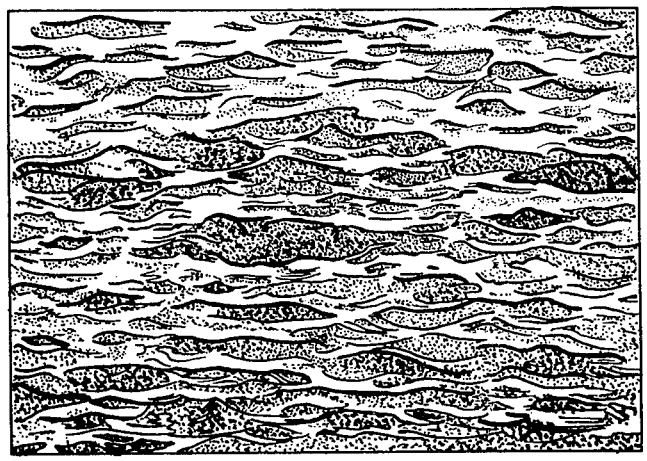
FIG. 5 is a representation of a photographic enlargement of the surface layer of the outer plastic coat of a coating material the coating process of which has been carried out in the usual way using a steel cooling roll.

Thus in FIG. 5 a greatly enlarged picture of the surface layer of a plastic coating that has been treated with a dry, brightly polished cooling roll is reproduced. As the Figure shows, the surface is full of pits which, when they become deep enough, produce holes in the plastic coating (pinholes). In order to avoid the formation of pinholes, which is very important if for example the coating material is to be used for the packing of sterilized goods, the thickness of the plastic coating must be great enough to ensure the depth of the pits formed in the surface coating do not exceed the thickness of the plastic layer. A dimensioning of the plastic coating without having to take into account the pits formed should therefore result in considerable commercial gains.

Figure 6:
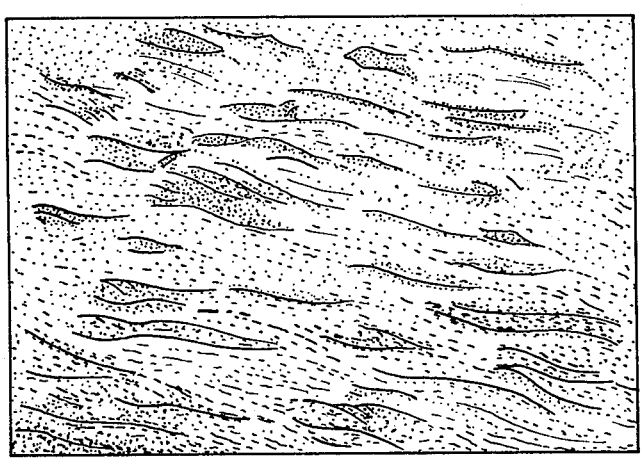
FIG. 6 is a representation of a photographic enlargement of the surface layer of an outer plastic layer of a coating material produced in accordance with the invention.

As shown by FIG. 6, which shows exactly the same material that was treated in accordance with the invention, the surface structure of the plastic coating which has been treated with a cooling roll to which a liquid layer consisting of water and ethyl alcohol has been applied, is considerably more uniform and the pits that can be seen in FIG. 5 hardly occur at all. The reason that the surface structure has been so considerably improved is not entirely clear but everything indicates that the ethyl alcohol, which has a boiling point of 78.5° C., is brought to boiling by the hot plastic coating, the surface temperature of which is in general above 100° C. when it is brought into contact with the cooling roll. Owing to the fact that the ethyl alcohol is brought to boiling a thin skin of vapour is formed around the cooling roll, which contributes to the uniform surface structure.

As can be seen from the above, several important advantages are obtained by means of the method of treatment of the invention in comparison with the previously known technique. In the first place a reduction of the tension in the Z-direction of the coating material is achieved and hence a diminished risk of delamination. In the second place, a very uniform surface structure of the plastic coating from the coating material is achieved which frequently means that the thickness of the plastic coat can be reduced. This is an important advantage because with the previous dimensioning of the plastic coating the risk of pinhole formation had to be taken into account.

The use of a wetting liquid involves added costs in comparison with some previously known techniques, but it has been found possible to collect the greater part of the ethyl alcohol for reuse. Hence, the costs of the wetting liquid in comparison with the advantages achieved are not important.

It will be understood that the preceding description of the embodiments of the present invention may be modified or changed without departing from the essential nature of the invention. It is intended to cover herein all such modifications which come within the meaning and scope of the following claims.

What is claimed is:

1. A process for the coating of a substrate, consisting of paper or paper lined with a metal foil, with polyethylene in which the polyethylene is extruded to a thin film which, while it is still warm, is brought into contact with the substrate and, with simultaneous cooling to a temperature below the softening temperature of the polyethylene, is pressed together with the substrate by passing the substrate and the extruded polyethylene film through cooperating rolls wherein at least one roll which is brought into contact with the polyethylene coating is a metal chill roll which is moistened on its rolling surface with a liquid having a critical surface tension below 73 dyne/cm and a boiling point below 100° C., and consisting of a mixture of water and between about 10% and about 50% ethyl alcohol, whereby an uninterrupted liquid layer is applied to the whole contact surface of the roll or rolls with the polyethylene coating.

2. A process according to claim 1, wherein the amount of ethyl alcohol in the liquid is between about 10% and about 35%.

3. A process according to claim 1, wherein the amount of ethyl alcohol in the liquid is about 25%.

4. A process according to claim 1, wherein the liquid is applied to the roll or rolls by a spraying process.

5. A process according to claim 1, wherein the liquid is fed to said roll by dipping parts of the roll into a vessel below the roll, which vessel contains the liquid.

6. A process according to claim 1, wherein the application of said liquid to the said roll is made by means of a coating device that is contacted with the roll.

7. A process according to claim 1, wherein the critical surface tension of said liquid is adjusted by admixture of sufficient ethyl alcohol to reduce the surface tension to a value approximately corresponding to the critical surface tension of the polyethylene thermoplastic material.

* * * * *